United States Patent
Goi (10) Patent No.: US 10,261,385 B2
(45) Date of Patent: Apr. 16, 2019

(54) LIGHT MODULATION ELEMENT

(71) Applicant: FUJIKURA LTD., Tokyo (JP)

(72) Inventor: Kazuhiro Goi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/850,791

(22) Filed: Dec. 21, 2017

(65) Prior Publication Data
US 2018/0180965 A1  Jun. 28, 2018

(30) Foreign Application Priority Data

Dec. 26, 2016 (JP) ................ 2016-251145

(51) Int. Cl.
| | | |
|---|---|---|
| *G02F 1/035* | (2006.01) | |
| *G02F 1/225* | (2006.01) | |
| *G02F 1/01* | (2006.01) | |
| *H04B 10/50* | (2013.01) | |
| *G02F 1/017* | (2006.01) | |
| *G02F 1/21* | (2006.01) | |

(52) U.S. Cl.
CPC .......... *G02F 1/2257* (2013.01); *G02F 1/0121* (2013.01); *G02F 1/035* (2013.01); *G02F 1/2255* (2013.01); *H04B 10/505* (2013.01); *H04B 10/50575* (2013.01); *G02F 1/01708* (2013.01); *G02F 2001/212* (2013.01); *G02F 2201/127* (2013.01); *G02F 2203/05* (2013.01)

(58) Field of Classification Search
None
See application file for complete search history.

(56) References Cited

U.S. PATENT DOCUMENTS

| | | | | |
|---|---|---|---|---|
| 6,522,793 B1* | 2/2003 | Szilagyi | ................. | G02F 1/225 385/1 |
| 6,818,466 B2* | 11/2004 | Kornrumpf | ............. | G02F 1/225 438/107 |
| 7,058,265 B2* | 6/2006 | Amparan | .............. | G02F 1/0356 385/40 |
| 2002/0159128 A1* | 10/2002 | Green | .................... | G02F 1/225 359/245 |

(Continued)

FOREIGN PATENT DOCUMENTS

JP   2006-065085 A   3/2006

OTHER PUBLICATIONS

L. Chen et al., "Chirp and dispersion tolerance of a single-drive push-pull silicon modulator at 28 Gb/s" IEEE Photonics Technology Letters, vol. 24, pp. 936-938, Jun. 1, 2012 (3 pages).

(Continued)

*Primary Examiner* — Tina M Wong
(74) *Attorney, Agent, or Firm* — Osha Liang LLP (57) ABSTRACT

A light modulation element constituted by a substrate type optical waveguide has a Mach-Zehnder interferometer; and a traveling wave electrode having a signal electrode arranged at least between a first phase modulator and a second phase modulator and electrically connected to both of the first phase modulator and the second phase modulator. A polarity of a semiconductor region of the first phase modulator connected to the signal electrode and a plurality of a semiconductor region of the second phase modulator connected to the signal electrode are different from each other.

10 Claims, 4 Drawing Sheets

(56) References Cited

U.S. PATENT DOCUMENTS

| | | | |
|---|---|---|---|
| 2002/0191266 A1* | 12/2002 | Melloni | G02F 1/225 |
| | | | 359/246 |
| 2005/0134952 A1* | 6/2005 | Sugiyama | G02F 1/0316 |
| | | | 359/245 |
| 2005/0254743 A1 | 11/2005 | Akiyama et al. | |
| 2009/0232440 A1* | 9/2009 | Kawanishi | H04B 10/505 |
| | | | 385/3 |
| 2012/0027336 A1* | 2/2012 | Park | G02F 1/025 |
| | | | 385/3 |
| 2015/0293427 A1* | 10/2015 | Goi | G02F 1/025 |
| | | | 385/3 |
| 2018/0046057 A1* | 2/2018 | Yu | G02F 1/025 |
| 2018/0180965 A1* | 6/2018 | Goi | G02F 1/2257 |

OTHER PUBLICATIONS

S. J. Spector, et al., "CMOS-compatible dual-output silicon modulator for analog signal processing" Optics Express, vol. 16, No. 15, pp. 11027-11031, Jul. 21, 2008 (5 pages).

* cited by examiner

LIGHT MODULATION ELEMENT

CROSS REFERENCE TO RELATED APPLICATIONS

Priority is claimed on Japanese Patent Application No. 2016-251145, filed on Dec. 26, 2016, the contents of which are incorporated herein by reference.

BACKGROUND

Field of the Invention

The present invention relates to a light modulation element.

Description of Related Art

Currently, the amount of information used in optical communications is increasing steadily. In order to cope with an increase in the amount of information, countermeasures such as enhancing the signaling speed and increasing the number of channels by wavelength division coupling are progressing in optical communication networks such as the backbone, the metro, and the access. However, for this purpose, a system required for optical communication becomes complicated and there are problems such as large-sized and expensive equipment, increased power consumption, and the like.

Also in data centers that are increasing in recent years, it is necessary to cope with the increase in the amount of information. Conventionally, in the communication between computers in the data center, electric signals were mainly transmitted by metal cables. Meanwhile, from the demand for higher communication speed and reduction of power consumption, use of optical communication using optical fibers has been progressed in recent years. Furthermore, the introduction of optical communication is an issue for each level in the computer's board and in the CPU.

In recent years, optical devices using high refractive index semiconductor materials such as silicon, InP, and GaAs have attracted attention as a technology in the optical communication networks and further introduce optical communication to new fields.

When the above-mentioned materials are used, an optical waveguide having a strong optical confinement effect can be constructed and an optical device can be downsized. If the same function is employed, the optical device can be reduced in size and, if the same size is employed, more functions can be realized. In addition, it is possible to perform electrical control making full use of semiconductor material and it is possible to realize devices with variable characteristics such as optical modulators.

Furthermore, devices using silicon have many common elements with technologies/apparatuses related to semiconductor processes used in manufacturing semiconductor devices such as conventional CPU and memory such that low-cost devices can be expected at mass production. Integration with conventional semiconductor devices on the same substrate has the possibility of further speeding up equipment and lowering the power consumption by replacing part of the electric signals on metal wires so far with optical signals.

Under such circumstances, optical modulators are one of the main devices in optical communication in which electric signals are converted into optical signals. A Mach-Zehnder (MZ) type optical modulator is a representative constitution used as an optical modulator for an optical integrated device. The MZ type optical modulator is configured to branch light into two waveguides, subsequently couple the two waveguides by adding a phase difference, and modulate output light by interference.

In order to realize low frequency chirping, which is one of the features of the MZ type optical modulator, it is necessary to perform push-pull driving in which voltage is applied so as to generate phase modulation of opposite phase in two arms. In this case, the push-pull driving can be performed by applying a voltage such that the operation in each of the two arms is opposite in phase by differential driving using two high frequency signals.

On the other hand, when two high frequency signals are used, complication of electrode layout and an increase in footprint may be caused.

Japanese Unexamined Patent Application, First Publication No. 2006-65085 discloses that the structure of both arms is created so as to be symmetrical with respect to the center and a high frequency signal is output to both end portions while applying a bias to the central portion of the structure. It is disclosed that, with this structure, push-pull driving is performed by single driving using one high frequency signal without using differential driving.

In addition, L. Chen et al., "Chirp and dispersion tolerance of a single-drive push-pull silicon modulator at 28 Gb/s", IEEE Photonics Technol. Lett. 24, 936-938 (2012) (hereinafter referred to as L. Chen et al.) discloses that push-pull driving with a single electrode is performed with a similar constitution using a silicon optical waveguide.

On the other hand, in the constitutions disclosed by Japanese Unexamined Patent Application, First Publication No. 2006-65085 and L. Chen et al., a voltage applied to a phase modulation section is divided to the respective arms and thus is made half of drive amplitude. Therefore, when it is attempted to attain the same modulation as the differential driving, the drive amplitude needs to be doubled, which may lead to an increase in power consumption.

S. J. Spector, et al., "CMOS-compatible dual-output silicon modulator for analog signal processing.," Opt. Express 16, 11027-11031 (2008) (hereinafter referred to as S. J. Spector, et al.) discloses a constitution in which pnpn and a silicon waveguide are arranged from the periphery and a high frequency signal is output to the center thereof. In this constitution, since the drive amplitude is applied to each arm, modulation efficiency equivalent to that of the differential driving can be attained by single driving with voltage amplitude equivalent to one side of differential driving (p side or n side).

On the other hand, the constitution disclosed in S. J. Spector, et al. is a lumped constant type drive circuit and, because it is not of a traveling wave electrode type, high-speed modulation may be restricted. That is, since the speed of light is finite, the phase of the electric signal, particularly a high frequency component changes during the propagation through the waveguide and the modulation efficiency decreases, which leads to deterioration of a high frequency characteristic. If the length of the phase modulation section is shortened to avoid such disadvantage, the modulation efficiency may be lowered. Therefore, with the constitution disclosed in S. J. Spector, et al., it may be difficult to simultaneously achieve high-speed modulation and high modulation efficiency.

The present invention has been made in view of the above circumstances and provides a traveling wave electrode type light modulation element capable of high-speed modulation and capable of realizing single driving with high modulation efficiency.

SUMMARY

One or more embodiments are directed to a light modulation element constituted by a substrate type optical waveguide, including: a Mach-Zehnder interferometer having an optical branch that branches light incident on the substrate type optical waveguide; first arm section and second arm section that guide light branched by the optical branch; a first phase modulation section (i.e., modulator) having a first semiconductor region and a second semiconductor region provided in the first arm section and provided continuously so as to have mutually different polarities in a direction intersecting with a propagation direction of light; a second phase modulation section (i.e., modulator) having a third semiconductor region and a fourth semiconductor region provided in the second arm section and provided continuously so as to have mutually different polarities in the direction intersecting with the propagation direction of light; and an optical coupler that couples light guided from the first arm section and second arm section; a traveling wave electrode arranged such that an electric field propagates in the propagation direction of light in the first arm section and the second arm section; and a bias applying section that is electrically connected to the traveling wave electrode and is capable of applying a bias voltage to the first and second phase modulation sections. In addition, the traveling wave electrode has a signal electrode arranged at least between the first phase modulation section and the second phase modulation section and electrically connected to both the second semiconductor region and the third semiconductor region; a first electrode arranged so as to face the signal electrode with the first phase modulation section interposed therebetween and electrically connected to the first semiconductor region; and a second electrode arranged so as to face the signal electrode with the second phase modulation section interposed therebetween and electrically connected to the fourth semiconductor region. A polarity of the second semiconductor region and a polarity of the third semiconductor region are different from each other.

According to one or more embodiments , in the light modulation element, the bias applying section may have a first DC block section and a second DC block section each electrically connected to a first end of an input end or an output end of each of at least two electrodes among the signal electrode, the first electrode, and the second electrode; and RF block sections electrically connected to the first end, and a second end on an opposite side of the first end of each of the at least two electrodes electrically connected to the first DC block section and the second DC block section may be electrically connected to each of a third DC block section and a fourth DC block section.

According to one or more embodiments, in the light modulation element, the at least two electrodes may include the first electrode and the second electrode.

According to one or more embodiments, in the light modulation element, the first DC block section electrically connected to the output end of the first electrode and the second DC block section electrically connected to the output end of the second electrode may be arranged symmetrically with respect to a wire through which an RF signal flows and the third DC block section electrically connected to the input end of the first electrode and the fourth DC block section electrically connected to the input end of the second electrode may be arranged symmetrically with respect to a wire through which an RF signal flows.

According to one or more embodiments, in the light modulation element, the at least two electrodes may include the signal electrode and the first electrode.

According to one or more embodiments, in the light modulation element, the RF block sections may be electrically connected to the output ends of the at least two electrodes.

According to the light modulation elements of one or more embodiments, in the light modulation element in which the polarity of the semiconductor region of the first phase modulation section connected to the signal electrode and the polarity of the semiconductor region of the second phase modulation section connected to the signal electrode are different from each other, the bias applying section is electrically connected to the traveling wave electrode, whereby a traveling wave electrode type light modulation element capable of high-speed modulation and capable of realizing single driving with high modulation efficiency can be provided.

DETAILED DESCRIPTION

Figure 1:
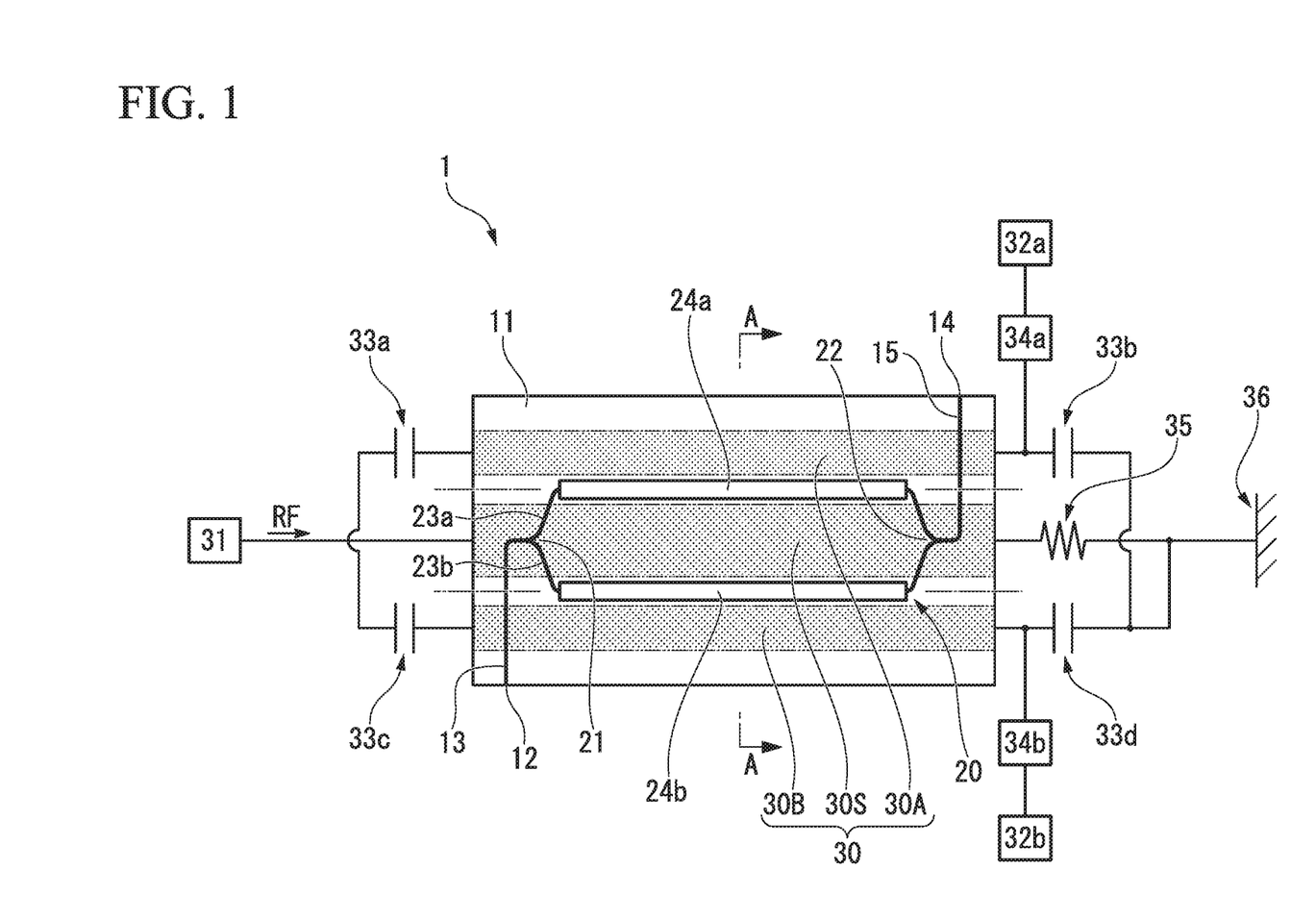
FIG. 1 is a diagram showing a constitution of a light modulation element according to one or more embodiments.

FIG. 1 shows a light modulation element 1 according to one or more embodiments. The light modulation element 1 is constituted by a substrate type optical waveguide 11 including a Mach-Zehnder interferometer 20.

The Mach-Zehnder interferometer 20 has two arm sections 23a and 23b (a first arm section 23a and a second arm section 23b) connected to an optical branch 21 that branches into 1×2 (one input and two outputs) and two arm sections 23a and 23b (a first arm section 23a and a second arm section 23b) connected to an optical coupler 22 that couples to 2×1 (two inputs and one output). Light proceeding from a light incidence section 12 through an optical waveguide 13 and being incident on the optical branch 21 is branched to the two arm sections 23a and 23b by the optical branch 21. Thereafter, the branched light is coupled into one beam of light by the optical coupler 22 by way of the two arm sections 23a and 23b and the coupled light proceeds through an optical waveguide 15 and is emitted from a light emitting section 14.

A phase modulation section (first phase modulation section) 24a is provided in the first arm section 23a.

In addition, a phase modulation section (second phase modulation section) 24b is provided in the second arm section 23b. In one or more embodiments, the phase modulation sections 24a and 24b have a linear shape.

The substrate type optical waveguide 11 is provided with a traveling wave electrode 30 capable of applying a bias voltage to the phase modulation sections 24a and 24b. When the traveling wave electrode 30 is used, it is possible to enlarge a modulation band by placing the electrode in the same direction as a propagation direction of light and matching the propagation speed of an electric signal with the propagation speed of light. In addition, when the traveling wave electrode 30 is used, it is possible to enlarge the modulation band also by reducing the influence of RC coupling caused by the capacitance and the resistance from the electrode to a junction, which serves as a dominant factor of signal deterioration when a lumped constant type electrode is used.

In one or more embodiments, the traveling wave electrode 30 has a signal electrode 30S and two electrodes 30A and 30B. The signal electrode 30S is arranged at least between two phase modulation sections 24a and 24b. In addition, the electrode 30A is arranged on a side of the phase modulation section 24a opposite to a side on which the signal electrode 30S is provided. Furthermore, the electrode 30B is arranged on a side of the phase modulation section 24b opposite to a side on which the signal electrode 30S is provided. In other words, the electrode 30A is arranged so as to face the signal electrode 30S with the phase modulation section 24a interposed therebetween and the electrode 30B is arranged so as to face the signal electrode 30S with the phase modulation section 24b interposed therebetween. Here, the two electrodes 30A and 30B function as a ground electrode for a high frequency signal (AC component) described later. That is, the traveling wave electrode 30 has a coplanar electrode structure composed of ground-signal-ground (GSG).

By outputting an RF electric signal (hereinafter referred to as "RF signal") from an RF signal inputter 31 connected to an electric signal source (not shown) to the signal electrode 30S, in the phase modulation sections 24a and 24b, light propagating through the respective arm sections 23a and 23b is imparted a predetermined phase difference and light coupled by the optical coupler 22 is modulated according to the phase difference.

Figure 2:
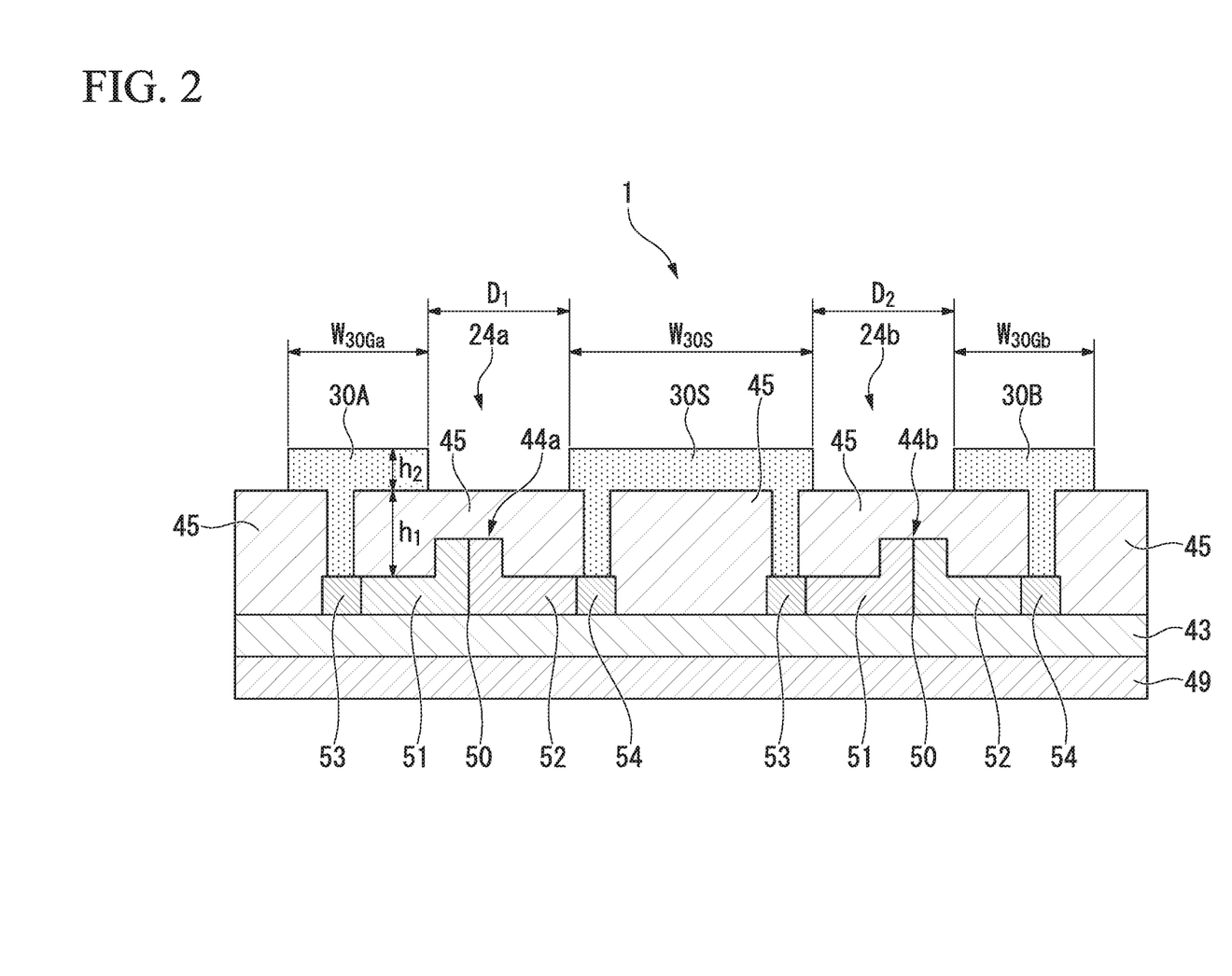
FIG. 2 is a cross-sectional view taken along line A-A in FIG. 1.

FIG. 2 is a cross-sectional view taken along line A-A in FIG. 1, showing a cross-sectional structure of the phase modulation sections 24a and 24b and the traveling wave electrode 30. The cross section is perpendicular to the propagation direction of light.

As shown in FIG. 2, rib waveguides are formed in the phase modulation sections 24a and 24b.

The phase modulation sections 24a and 24b are formed on a substrate 49 and are constituted by a lower cladding 43, cores 44a and 44b, respectively, and an upper cladding 45. The signal electrode 30S and the two electrodes 30A and 30B are provided on the upper cladding 45 and are electrically connected to the cores 44a and 44b by passing through the upper cladding 45. In FIG. 2, the signal electrode 30S is electrically connected to a second N-type semiconductor portion 54 of the phase modulation section 24a and a second P-type semiconductor portion 53 of the phase modulation section 24b.

In addition, the electrode 30A is electrically connected to a second P-type semiconductor portion 53 of the phase modulation section 24a. Furthermore, the electrode 30B is electrically connected to a second N-type semiconductor portion 54 of the phase modulation section 24b.

The substrate 49 is made of undoped silicon and the lower cladding 43 formed of, for example, silica is provided on a top surface of the substrate 49.

The cores 44a and 44b having rib portions are provided on the lower cladding 43. The substrate 49, the lower cladding 43, and the cores 44a and 44b utilize a substrate, a BOX layer, and an SOI layer of a silicon-on-insulator (SOI) wafer, respectively.

As shown in FIG. 2, each of the cores 44a and 44b of the rib waveguide of one or more embodiments are composed of a rib portion (thick plate portion) having a large thickness and respective slab portions (thin plate portions) having small thicknesses and connected to both sides of the rib portion.

In each of the cores 44a and 44b, there are a first P-type semiconductor portion 51 and a first N-type semiconductor portion 52 constituting a PN diode. A PN junction 50 is formed at a boundary between the first P-type semiconductor portion 51 and the first N-type semiconductor portion 52.

The doping densities of the first P-type semiconductor portion 51 and the first N-type semiconductor portion 52 are both about $10^{18}$ cm$^{-3}$, for example.

The second P-type semiconductor portion 53 is connected to a side surface of the first P-type semiconductor portion 51 in a region opposite to a side where the PN junction 50 is formed with respect to the first P-type semiconductor portion 51. In addition, the second N-type semiconductor portion 54 is connected to a side surface of the first N-type semiconductor portion 52 in a region opposite to a side where the PN junction 50 is formed with respect to the first N-type semiconductor portion 52.

The second P-type semiconductor portion 53 is highly doped so as to form an ohmic contact with the electrode 30A and has a higher doping density than that of the first P-type semiconductor portion 51. In addition, the second N-type semiconductor portion 54 is highly doped so as to form an ohmic contact with the electrode 30B and has a higher doping density than that of the first N-type semiconductor portion 52. For example, both the second P-type semiconductor portion 53 and the second N-type semiconductor portion 54 have a doping density of about $10^{20}$ cm$^{-3}$.

Dopants (impurities) for imparting conductivity to the first P-type semiconductor portion 51, the first N-type semiconductor portion 52, the second P-type semiconductor portion 53, and the second N-type semiconductor portion 54 can be appropriately selected and used according to a matrix medium. For example, if the matrix medium is a group IV semiconductor such as silicon, a group III element such as boron (B) is exemplified as a P-type dopant, while a group V element such as phosphorus (P) or arsenic (As) is an exemplary example of an N-type dopant.

A depletion layer is generated in the PN junction 50 which is a boundary between the first P-type semiconductor portion 51 and the first N-type semiconductor portion 52. By applying a voltage from the outside to this PN structure through the signal electrode 30S or the like, the carrier distribution of the PN junction 50 varies and the width of the depletion layer changes.

Since the refractive index of silicon changes depending on a carrier density, it is possible to control the effective refractive index of the optical waveguide by the voltage through the change of the carrier distribution and to control the phase state of light at the time of outputting the phase modulation section.

The upper cladding 45 made of, for example, silica is provided on the rib portions and the slab portions of the cores 44a and 44b. For example, the upper cladding 45 is created by depositing silica using a manufacturing method such as CVD.

One electrode among the signal electrode 30S and the electrodes 30A and 30B is connected to an upper surface of each of the second P-type semiconductor portions 53 and the second N-type semiconductor portions 54.

In one or more embodiments, phase modulation operation is performed by changing the carrier distribution in the cores 44a and 44b. When the PN junction 50 is formed, a depletion layer is generated at a boundary thereof. At that time, the width of the depletion layer changes depending on the applied bias voltage. If a forward bias voltage is applied to the PN junction 50, a current flows and the carrier density in the waveguide is raised. The carrier density can be controlled by adjusting the voltage so as to obtain a desired current density. On the other hand, if a reverse bias voltage is applied, the depletion layer expands and the carrier density is lowered. The width of the depletion layer can be controlled by voltage so as to obtain a desired carrier density. With regard to this operating condition, driving may be performed in a forward bias range, or driving may be performed in a reverse bias range. By employing the forward bias, a phase modulation element with high modulation efficiency can be formed. In contrast to this, by employing the reverse bias, a phase modulation element excellent in high-speed response can be realized. As described above, in either case, it is possible to realize a phase modulation element having high modulation efficiency or a phase modulation element excellent in high-speed response.

In both cases of the reverse bias and the forward bias, the direction of phase modulation is fixed by a method of applying voltage to the PN junction 50. Therefore, in order to induce a phase change in the reverse direction in the two arm sections 23a and 23b, it is necessary to perform operation in such a manner that a voltage applied to the PN junction 50 at one arm section is raised and at the same time a voltage applied to the PN junction 50 at another arm section is lowered.

In order to realize this operation, in one or more embodiments, the first phase modulation section 24a and the second phase modulation section 24b are arranged such that the polarities of the semiconductor regions are alternate as shown in FIG. 2 and the polarities of the semiconductor regions of the two phase modulation sections 24a and 24b connected to the signal electrode 30S are different from each other.

Here, in one or more embodiments, the semiconductor regions refer to a region in which the first P-type semiconductor portion 51 and the second P-type semiconductor portion 53 adjacent to each other are continuously formed (in FIG. 1, a first semiconductor region and a third semiconductor region are applicable) and a region where the first N-type semiconductor portion 52 and the second N-type semiconductor portion 54 adjacent to each other are continuously formed (in FIG. 1, the second semiconductor region and the fourth semiconductor region are applicable). That is, in one or more embodiments, two semiconductor regions (the first semiconductor region and the second semiconductor region) having mutually different polarities are continuously provided in the first phase modulation section 24a and, in a similar manner, two semiconductor regions (the third semiconductor region and the fourth semiconductor region) having mutually different polarities are continuously provided in the second phase modulation section 24b. Additionally, the polarity (N type) of the semiconductor region (second semiconductor region) of the first phase modulation section 24a (core 44a) connected to the signal electrode 30S and the polarity (P type) of the semiconductor region (third semiconductor region) of the second phase modulation section 24b (core 44b) connected to the signal electrode 30S are formed so as to be different from each other.

With this constitution, the single driving can be performed by individually adjusting a DC bias of each electrode and outputting the RF signal to the signal electrode 30S.

In addition, in one or more embodiments, since the traveling wave electrode 30 is used as a driving method for the light modulation element 1, high-speed operation of phase modulation is possible.

Furthermore, in one or more embodiments, since the semiconductor regions are arranged such that the polarities are alternate between the first semiconductor region and the second semiconductor region, the second semiconductor region and the third semiconductor region, and the third semiconductor region and the fourth semiconductor region as described above and the traveling wave type electrode is used, no sharp decrease in modulation efficiency occurs and the band is extended to high frequencies, whereby high-speed transmission is possible. This is because the electric signal that gives a modulating action to light travels alongside the light and it is possible to suppress a change in the phase of the electric signal that changes while the light propagates through the phase modulation section.

In one or more embodiments, as shown in FIG. 1, a bias applying section for applying a bias voltage to the phase modulation sections 24a and 24b is electrically connected to the traveling wave electrode 30. The bias applying section has DC block sections 33b and 33d, RF block sections 34a and 34b, a terminating resistor 35, and a ground terminal 36. In addition, the RF signal inputter 31 is connected to an input end of the signal electrode 30S through a wire, a DC bias inputter 32a is connected to the RF block section 34a through a wire, a DC bias inputter 32b is connected to the RF block section 34b through a wire. Furthermore, a DC block section 33a is connected to an input end of the electrode 30A through a wire, a DC block section 33c is connected to an input end of the electrode 30B through a wire, and the DC block section 33a and the DC block section 33c are connected to each other through one wire. Here, the "DC block section 33b" in one or more embodiments corresponds to an example of a "first DC block section", the "DC block section 33d" corresponds to an example of a "second DC block section", the "DC block section 33a" corresponds to an example of a "third DC block section", the "DC block section 33c" corresponds to an example of a "fourth DC block section", and the "RF block sections 34a and 34b" correspond to an example of "RF block sections". Each of the first DC block section and the second DC block section is electrically connected to one end (first end) out of an input end or an output end of each of at least two electrodes among the signal electrode 30S, the electrode 30A, and the electrode 30B. In addition, the RF block section is electrically connected to the same one end as the input end or the output end of each of the above-mentioned two electrodes electrically connected to the first DC block section and the second DC block section. Accordingly, the bias applying section is electrically connected to one end of the input end or the output end of each of at least two electrodes among the signal electrode 30S, the electrode 30A, and the electrode 30B. Therefore, the first DC block section, the second DC block section, and the RF block sections included in the bias applying section, which serve as the DC block section 33b, the DC block section 33d, and the RF block sections 34a and 34b, respectively, are all electrically connected to the output ends of the electrodes 30A and 30B. However, the present invention is not limited thereto and, for example, all of these sections may be electrically connected to the input ends of the electrodes 30A and 30B. In addition, each of the third DC block section and the fourth DC block section is electrically connected to another end (second end) on a side opposite to the one end of each of the at least two electrodes electrically connected to the first DC block section and the second DC block section described above. Accordingly, each of the third DC block section and the fourth DC block section is electrically connected to another end on a side opposite to the one end of the input end or the output end to which the bias applying section is connected.

The input end of the signal electrode 30S is electrically connected to the RF signal inputter 31 capable of outputting the RF signal. In addition, the output end of the signal electrode 30S is electrically connected to the ground terminal 36 via the terminating resistor 35.

The input end of the electrode 30A is electrically connected to the DC block section 33a. A wire branching into two is connected to the output end of the electrode 30A, one of which is electrically connected to the DC block section 33b and another of which is electrically connected to the DC bias inputter 32a via the RF block section 34a.

In addition, the input end of the electrode 30B is electrically connected to the DC block section 33c. Similarly to the electrode 30A, a wire branching into two is connected to the output end of the electrode 30B, one of which is electrically connected to the DC block section 33d and another of which is electrically connected to the DC bias inputter 32b via the RF block section 34b.

Furthermore, a side of the DC block section 33a opposite to a side connected to the electrode 30A and a side of the DC block section 33c opposite to a side connected to the electrode 30B are electrically connected by, for example, one wire or the like. Additionally, two wires of a wire extending from a side of the DC block section 33b opposite to a side connected to the electrode 30A and a wire extending from a side of the DC block section 33d opposite to a side connected to the electrode 30B are gathered into one wire and then electrically connected to the ground terminal 36. Alternatively, the above-mentioned two wires may be individually connected to the ground terminal 36 without being gathered into one wire.

The DC block sections 33a to 33d are elements that cut off the DC bias and pass the RF signal and, for example, are capacitors.

In addition, the RF block sections 34a and 34b are elements that cut off the RF signal and pass the DC bias and are elements having inductance or resistance, such as inductors, coils, or resistors.

In this constitution, each pair of the RF block section 34a and the DC block section 33b, and the RF block section 34b and the DC block section 33d constitutes a bias tee.

Since one or more embodiments have the above constitution, in the signal electrode 30S, it is possible to apply an arbitrary DC bias to the phase modulation sections 24a and 24b by forming a termination circuit. That is, in the electrodes 30A and 30B, DC bias components from the cores 44a and 44b of the phase modulation sections 24a and 24b are blocked by the DC block sections 33a to 33d. Then, the DC bias can be applied to the phase modulation section 24a from the DC bias inputter 32a via the RF block section 34a while the influence on a high frequency component is suppressed. Furthermore, the DC bias can be applied to the phase modulation section 24b from the DC bias inputter 32b via the RF block section 34b while the influence on a high frequency component is suppressed.

Therefore, it is possible to realize a traveling wave electrode type light modulation element capable of high-speed modulation and capable of realizing the single driving with high modulation efficiency.

In this case, for example, if driving under the reverse bias is a prerequisite, the reverse bias can be obtained by specifying voltages applied to the respective electrodes from the DC bias inputters 32a and 32b as $V_{30A} < V_{30S}$ (GND) $< V_{30B}$ in the constitution in FIGS. 1 and 2. Note that in one or more embodiments an appropriate DC bias value is determined according to the amplitude of a drive signal. For example, when the amplitude is 1 Vpp, the reverse bias can be maintained over the entire operation range of the RF signal by specifying $V_{30A} < V_{30S} - 0.5$ V. As a result, high-speed operation can be performed.

In one or more embodiments, the constitution of the bias applying section is symmetrical with respect to a horizontal direction within a vertical plane of the propagation direction of light. In other words, the DC block section 33a electrically connected to the input end of the electrode 30A and the DC block section 33c electrically connected to the input end of the electrode 30B are arranged symmetrically with respect to a wire through which the RF signal flows and the DC block section 33b electrically connected to the output end of the electrode 30A and the DC block section 33d electrically connected to the output end of the electrode 30B are arranged symmetrically with respect to a wire through which the RF signal flows. If the constitution of the bias applying section is asymmetric, especially when the DC block section is a capacitor, a large footprint is required in comparison with an electrode used in the light modulation element in many cases and deterioration of characteristic impedance and deterioration of a high frequency characteristic due to the excitation of a slot mode may occur.

By making the bias applying section symmetrical as in one or more embodiments, it is possible to suppress the excitation of the slot mode caused by the asymmetry of the traveling wave electrode and to prevent deterioration of the high frequency characteristic.

Here, note that the above-mentioned wires through which the RF signal flows refer to the wire connecting between the RF signal inputter 31 and the signal electrode 30S and the wire connecting between the signal electrode 30S and the terminating resistor 35 in FIG. 1, but in the present invention, the wires are not limited to those described above.

Figure 3:
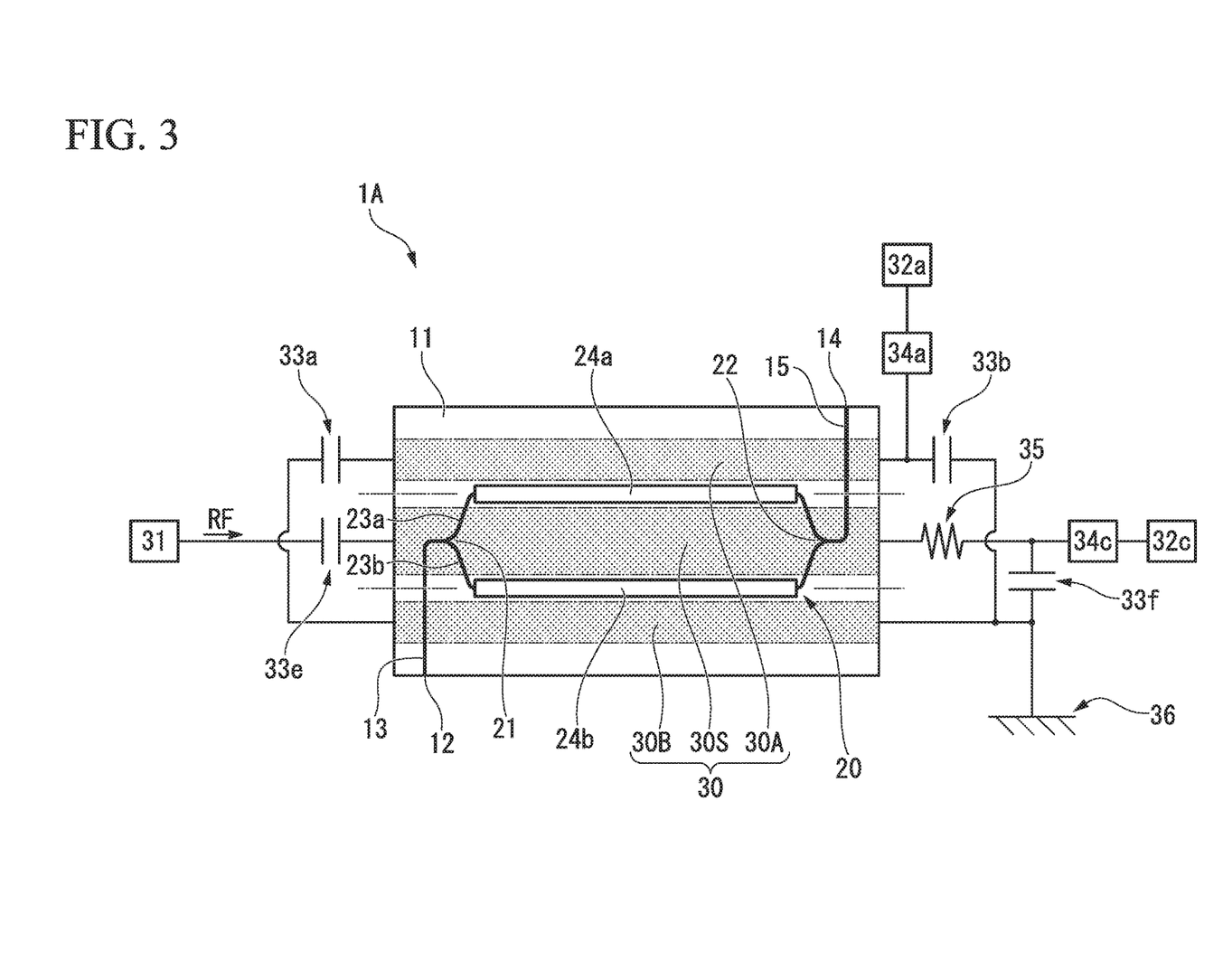
FIG. 3 is a diagram showing a constitution of a light modulation element according to one or more embodiments.

FIG. 3 shows a light modulation element 1A according to one or more embodiments.

The light modulation element 1A has a constitution of a bias applying section different from that of the light modulation element 1. Accordingly, in the following explanation, the same reference numbers are given to constitutions similar to those already described and redundant explanations are omitted.

As shown in FIG. 3, in the bias applying section of the light modulation element 1A according to one or more embodiments, a DC bias inputter 32c is used instead of the DC bias inputter 32b used in the light modulation element 1, a DC block section 33e is used instead of the DC block section 33c, a DC block section 33f is used instead of the DC block section 33d, and an RF block section 34c is used instead of the RF block section 34b. In addition, the DC bias inputter 32c, the DC block sections 33e and 33f, and the RF block section 34c are provided at different positions from the DC bias inputter 32b, the DC block sections 33c and 33d, and the RF block section 34b of the light modulation element 1, respectively. Therefore, the bias applying section has DC block sections 33b and 33f, RF block sections 34a and 34c, a terminating resistor 35, and a ground terminal 36. Next, the details of the above explanation will be described hereinafter together with other constitutions. Here, an input end of a signal electrode 30S is electrically connected to an RF signal inputter 31 capable of outputting the RF signal via the DC block section 33e. In addition, a wire branching into two is connected to an output end of the signal electrode 30S via the terminating resistor 35, one of which is electrically connected to the DC block section 33f and another of which is electrically connected to the DC bias inputter 32c via the RF block section 34c. Furthermore, a wire further branching into two is connected to a side of the DC block section 33f opposite to a side connected to the signal electrode 30S, one of which is electrically connected to an output end of an electrode 30B and another of which is electrically connected to the ground terminal 36.

Additionally, an input end of an electrode 30A is electrically connected to a DC block section 33a by a wire or the like. A wire branching into two is connected to an output end of the electrode 30A, one of which is electrically connected to the DC block section 33b and another of which is electrically connected to a DC bias inputter 32a via the RF block section 34a.

Furthermore, an input end of the electrode 30B is electrically connected to a side of the DC block section 33a opposite to a side connected to the electrode 30A by, for example, one wire or the like. A wire branching into two is connected to the output end of the electrode 30B, one of which is electrically connected to a side of the DC block section 33b opposite to a side connected to the electrode 30A. Another of the wire is further branched into two, one which is electrically connected to the DC block section 33f and another of which is electrically connected to the ground terminal 36.

In this constitution, each pair of the DC block section 33b and the RF block section 34a, and the DC block section 33f and the RF block section 34c constitutes a bias tee.

Since one or more embodiments have the above constitution, in the signal electrode 30S, it is possible to apply an arbitrary DC bias to phase modulation sections 24a and 24b by forming a termination circuit. That is, in the electrode 30A and the signal electrode 30S, DC bias components from cores 44a and 44b of the phase modulation sections 24a and 24b are blocked by the DC block sections 33a, 33b, 33e, and 33f. Then, the DC bias can be applied to the phase modulation section 24a from the DC bias inputter 32a via the RF block section 34a while the influence on the high frequency component is suppressed. Furthermore, the DC bias can be applied to the phase modulation section 24b from the DC bias inputter 32c via the RF block section 34c while the influence on a high frequency component is suppressed.

In this case, for example, if driving under the reverse bias is a prerequisite, the reverse bias can be obtained by specifying voltages applied to the respective electrodes from the DC bias inputters 32a and 32c as $V_{30A} < V_{30S} < V_{30B}$ (GND) in the constitution in FIGS. 2 and 3. Note that, as described above, in one or more embodiments an appropriate DC bias value is determined according to the amplitude of a drive signal. For example, when the amplitude is 1 Vpp, the reverse bias can be maintained over the entire operation range of the RF signal by specifying $V_{30A} < V_{30S} - 0.5$ V. As a result, high-speed operation can be performed.

In addition, since one or more embodiments have the above constitution, the following operation and effects can be attained.

That is, when a driver configured to drive the phase modulation sections 24a and 24b by inputting an electric signal to the RF signal inputter 31 is provided, there is a case where the DC block sections are arranged so as to be connected to the signal electrode 30S at the outside of the RF signal inputter 31 as viewed from the constitution in FIG. 3. If such a structure is employed, it is possible to achieve space saving and to reduce signal deterioration by sharing a DC block section of the driver and the DC block section 33e. Furthermore, by grounding one electrode among the electrodes 30A and 30B, it is possible to share the grounding with a component provided around the above-mentioned grounded electrode. Accordingly, this sharing of grounding enables simplification of a layout. Additionally, when a plurality of modulators is arranged adjacently, adjacent electrodes have an equal potential and can be shared if grounded and thus, space saving can be expected.

Note that, in FIGS. 1 and 3, the RF block sections and the DC bias inputters are connected to the output end side of the signal electrode and the electrodes, but the constitution is not limited thereto. The RF block sections and the DC bias inputters may be electrically connected to the input ends of the signal electrode and the two electrodes other than the signal electrode. However, if the RF block sections and the DC bias inputters are connected to the output end side of the signal electrode and the two electrodes other than the signal electrode, since the two phase modulation sections are provided on the input side of the RF signal inputter 31 with respect to the bias tee, deterioration due to an applied signal at the bias tee can be avoided when the electric signal acts on guided light which travels alongside the electric signal.

In addition, in FIG. 2, the PN junction 50, which is the boundary between the first P-type semiconductor portion 51 and the first N-type semiconductor portion 52, is formed in a direction perpendicular to the substrate 49, but the constitution is not limited thereto. The PN junction 50 is only required to be formed in a direction intersecting with the propagation direction of light.

EXAMPLE

Hereinafter, one or more embodiments will be concretely explained using an example using simulation. Note that the present invention is not limited to only this example.

As the constitution of the light modulation element of the example, the constitution of one or more embodiments shown in FIGS. 1 and 2 was used.

A Si substrate is used for the substrate and Si is adopted as the material of the lower cladding. In addition, doped silicon was used for the first P-type semiconductor portion, the first N-type semiconductor portion, the second P-type semiconductor portion, and the second N-type semiconductor portion. Al was used as the material of the traveling wave electrode.

The length of the phase modulation section was set to 4 mm and the respective dimensions of the phase modulation section shown in FIG. 2 are as follows.

D1, D2: 6.4 μm
$W_{30S}$: 10 μm
$W_{30Ga}$, $W_{30Gb}$: 30 μm
$h_1$, $h_2$: 2 μm

A case where a 1 μF capacitor is used as the DC block section, voltage is applied to the phase modulation section with a GSG probe, and high frequency signal is output to the signal electrode was simulated.

Since a DC component can be applied independently of the modulation of the high frequency component, the DC component was not applied from the DC bias inputter in the present example such that the characteristic with respect to an alternating current (high frequency component) is evaluated.

As a comparative example, a structure is employed in which a phase modulation section having the same cross-sectional structure as that of the example is configured as a concentrated multiplier type electrode as described in S. J. Spector, et al. That is, simulation was performed on a constitution obtained by excluding the constitution of the terminating section including the DC block section 33b, the DC block section 33d, the terminating resistor 35, and the ground terminal 36 from the constitution shown in FIG. 1, by assuming an ideal state in which the voltage applied to one point of the electrode is instantaneously transferred to the entire surface of the phase modulation section. In this case, it is assumed that a high frequency signal is output to the signal electrode, the two electrodes other than the signal electrode function as ground electrodes for the high frequency signal, and the DC component for constituting the reverse bias is applied.

Figure 4:
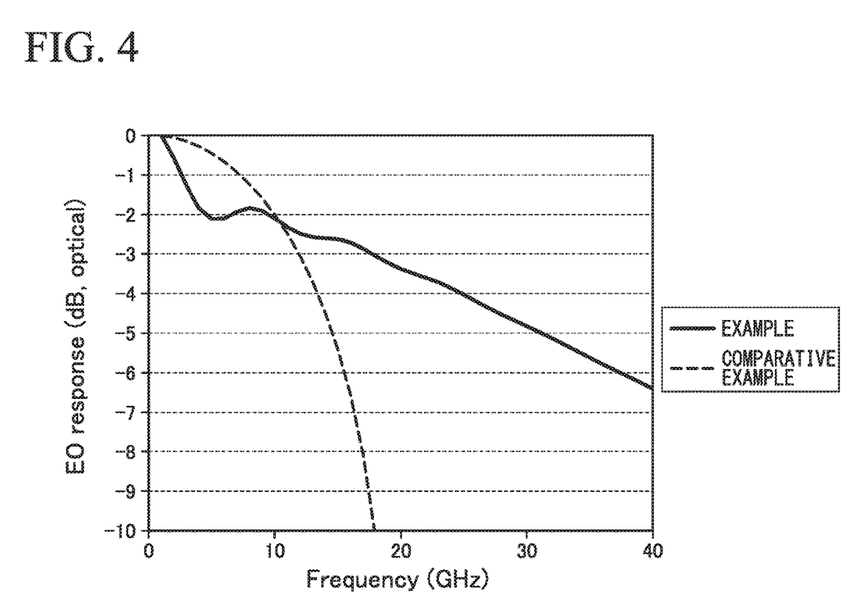
FIG. 4 is a diagram showing simulation results of an example and a comparative example according to one or more embodiments.

FIG. 4 shows simulation results of the example and the comparative example. The horizontal axis of the graph in FIG. 4 represents the frequency of the high frequency component to be output and the vertical axis represents the electrooptical response (the amplitude of an optical signal output when an electric signal of specific amplitude is input).

In the comparative example, the electrooptical response sharply decreases with increasing frequency. This is considered to be due to the fact that the speed of light is finite and the phase of the applied electric signal changes by the amount of time the light passes through the phase modulation section.

On the other hand, in the example, since the traveling wave type electrode is used, no sharp decrease in the electrooptical response occurs and the band is extended to high frequencies such that the high-speed transmission is possible. This is because the electric signal that gives a modulating action to light travels alongside the light and it is possible to suppress a change in the phase of the electric signal that changes while the light propagates through the phase modulation section.

Note that, regarding the attenuation on the high frequency side, it is considered that, if a compensation technology for a high frequency band using a digital coherent technology is used, higher frequency transmission can be coped with by compensating gentle band attenuation up to the high frequency side.

Although the light modulation element has been described thus far, the present invention is not limited to the above examples and can be appropriately modified without departing from the gist of the invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A light modulation element constituted by a substrate type optical waveguide, comprising:
    a Mach-Zehnder interferometer, comprising:
        an optical branch that branches light incident on the substrate type optical waveguide;
        a first arm section and a second arm section that guide light branched by the optical branch;
        a first phase modulator comprising: a first semiconductor region and a second semiconductor region disposed continuously in the first arm section, wherein the continuously disposed first and second semiconductor regions have mutually different polarities in a direction intersecting with a propagation direction of light;
        a second phase modulator comprising: a third semiconductor region and a fourth semiconductor region disposed continuously in the second arm section, wherein the continuously disposed third and fourth semiconductor regions have mutually different polarities in the direction intersecting with the propagation direction of light; and
        an optical coupler that couples light guided from the first arm section and the second arm section;
    a traveling wave electrode arranged such that an electric field propagates in the propagation direction of light in the first arm section and the second arm section; and
    a bias applying section that is electrically connected to the traveling wave electrode and applies a bias voltage to the first phase modulator and the second phase modulator, wherein the traveling wave electrode comprises:
        a signal electrode arranged at least between the first phase modulator and the second phase modulator and electrically connected to both the second semiconductor region and the third semiconductor region;
        a first electrode arranged to face the signal electrode with the first phase modulator interposed therebetween and electrically connected to the first semiconductor region; and
        a second electrode arranged to face the signal electrode with the second phase modulator interposed therebetween and electrically connected to the fourth semiconductor region; and
    wherein a polarity of the second semiconductor region and a polarity of the third semiconductor region are different from each other.

2. The light modulation element according to claim 1, wherein
    the bias applying section comprises:
        a first DC block section and a second DC block section each electrically connected to a first end of an input end or an output end of each of at least two electrodes among the signal electrode, the first electrode, and the second electrode; and
        RF block sections that are electrically connected to the first end, and
    a second end on an opposite side of the first end of each of the at least two electrodes electrically connected to the first DC block section and the second DC block section is electrically connected to each of a third DC block section and a fourth DC block section.

3. The light modulation element according to claim 2, wherein the at least two electrodes are the first electrode and the second electrode.

4. The light modulation element according to claim 3, wherein the first DC block section electrically connected to the output end of the first electrode and the second DC block section electrically connected to the output end of the second electrode are arranged symmetrically with respect to a wire through which an RF signal flows, and the third DC block section electrically connected to the input end of the first electrode and the fourth DC block section electrically connected to the input end of the second electrode are arranged symmetrically with respect to the wire through which the RF signal flows.

5. The light modulation element according to claim 2, wherein the at least two electrodes are the signal electrode and the first electrode.

6. The light modulation element according to claim 2, wherein the RF block sections are electrically connected to the output ends of the at least two electrodes.

7. The light modulation element according to claim 3, wherein the RF block sections are electrically connected to the output ends of the at least two electrodes.

8. The light modulation element according to claim 4, wherein the RF block sections are electrically connected to the output ends of the at least two electrodes.

9. The light modulation element according to claim 5, wherein the RF block sections are electrically connected to the output ends of the at least two electrodes.

10. The light modulation element according to claim 2, wherein the first to fourth DC block sections cut off DC bias and pass RF signal.

* * * * *